US011950979B2

(12) United States Patent
Gilbert Reisman

(10) Patent No.: US 11,950,979 B2
(45) Date of Patent: Apr. 9, 2024

(54) ORTHODONTIC WIRE-BENDING ROBOT FOR LINGUAL ORTHODONTIC TECHNIQUE

(71) Applicant: Alfredo Gilbert Reisman, Mexico City (MX)

(72) Inventor: Alfredo Gilbert Reisman, Mexico City (MX)

(*) Notice: Subject to any disclaimer, the term of this patent is extended or adjusted under 35 U.S.C. 154(b) by 512 days.

(21) Appl. No.: 17/294,861

(22) PCT Filed: May 7, 2019

(86) PCT No.: PCT/MX2019/050007
§ 371 (c)(1),
(2) Date: May 18, 2021

(87) PCT Pub. No.: WO2020/111926
PCT Pub. Date: Jun. 4, 2020

(65) Prior Publication Data
US 2022/0008169 A1   Jan. 13, 2022

(30) Foreign Application Priority Data
Nov. 26, 2018  (MX) .................. MX/a/2018/014512

(51) Int. Cl.
*A61C 7/20* (2006.01)
*B21C 23/08* (2006.01)
(Continued)

(52) U.S. Cl.
CPC ............... *A61C 7/20* (2013.01); *B21C 23/08* (2013.01); *B21F 1/00* (2013.01); *B21F 1/006* (2013.01);
(Continued)

(58) Field of Classification Search
CPC .. B21C 23/08; B21F 1/00; B21F 1/006; B21F 1/008; B21F 45/008; A61C 7/002;
(Continued)

(56) References Cited

U.S. PATENT DOCUMENTS 5,291,771 A   3/1994  Tomo et al.
5,683,243 A   11/1997 Andreiko et al.
(Continued)

FOREIGN PATENT DOCUMENTS

CN  103892929   7/2014
CN  204562423   8/2015

OTHER PUBLICATIONS

DH40 Twin-turret, twin-head wire bending machine, https://www.blmgroup.com/wire-bending/dh40, published Mar. 12, 2019.

*Primary Examiner* — Edward T Tolan
(74) *Attorney, Agent, or Firm* — Emerson, Thomson, & Bennett, LLC; Roger D. Emerson; Matt J. Wilson

(57) ABSTRACT

An orthodontic wire bender robot to be used in the manufacture of orthodontic prostheses, having a cartesian type displacement frame that allows moving the bending head of the equipment along the X, Y and Z-axes, in order to enable the robot to execute bends by torque, performing horizontal, vertical and sagittal compensations so that the shaped orthodontic wire presents an incline on its faces at certain angle and segment in order to execute frontal rotation stresses.

10 Claims, 3 Drawing Sheets

(51) Int. Cl.
*B21F 1/00* (2006.01)
*B21F 45/00* (2006.01)
*B25J 9/16* (2006.01)
*B25J 11/00* (2006.01)
*B25J 13/00* (2006.01)

(52) U.S. Cl.
CPC ............ *B21F 45/008* (2013.01); *B25J 9/1615* (2013.01); *B25J 11/005* (2013.01); *B25J 13/006* (2013.01)

(58) Field of Classification Search
CPC .......... A61C 7/20; B25J 11/005; B21D 7/024; B21D 7/12
See application file for complete search history.

(56) References Cited

U.S. PATENT DOCUMENTS

| | | | |
|---|---|---|---|
| 7,047,785 B2* | 5/2006 | Peruzzo | B21F 23/007 72/422 |
| 7,093,475 B2* | 8/2006 | Cappello | B21D 7/12 72/307 |
| 7,661,281 B2 | 2/2010 | Rubbert et al. | |
| 7,721,582 B2* | 5/2010 | Speck | B21D 7/12 72/305 |
| 8,047,034 B2* | 11/2011 | Butscher | A61K 31/522 72/422 |
| 8,266,940 B2 | 9/2012 | Riemeier et al. | |
| 8,561,449 B2* | 10/2013 | Veit | B21D 11/12 72/157 |
| 8,631,674 B2 | 1/2014 | Christofilis et al. | |
| 2009/0007619 A1 | 1/2009 | Speck | |
| 2014/0076105 A1 | 3/2014 | Hong | |
| 2014/0130567 A1 | 5/2014 | Christofilis | |
| 2017/0312808 A1 | 11/2017 | Suto et al. | |
| 2017/0312818 A1 | 11/2017 | Son | |

* cited by examiner

ORTHODONTIC WIRE-BENDING ROBOT FOR LINGUAL ORTHODONTIC TECHNIQUE

FIELD OF INVENTION

The present invention refers to a novel wire bender robot for the manufacture of wire arches for lingual orthodontics and more particularly, the present invention provides a novel bending robot that allows automating the bending of wires intended to be used within known supports named lingual orthodontic brackets. The present invention allows three-dimensional bending (3D bending); the robot also having means for the displacement of the bending head through the X, Y and Z planes for greater precision and to allow bends by means of torque, performing horizontal, vertical and sagittal compensations to best match the archwire to the contours of the dental pieces where it will be placed, and thus provide the orthodontist with the possibility of elaborating all the bends, compensations and angulations required to carry out an orthodontic treatment.

BACKGROUND OF THE INVENTION

Lingual orthodontics is a technique that allows the orthodontic treatment of alignment of the teeth of a patient, where the orthodontic appliances cannot be seen from outside the mouth, that is, the appliances used cannot be perceived from the exterior, since the brackets and archwire used are placed inside the dental arch, so that the exterior surface of the teeth is completely free. In addition to the aesthetic aspect, lingual orthodontics provides other benefits, among which is a lower risk of decalcification, since the lingual surface of the teeth is more resistant than the vestibular surface and therefore, there is less damage to the enamel and a lower risk of cavities; also, since the force of the orthodontic appliance is applied in the linguo-vestibular direction, the dental arch expansion is easier to implement.

However, even with the above advantages, the correct application of this technique is restricted to the creation of a lingual arch that is as precise as possible, since it requires that the arch be made with a high degree of precision, since it must present a surface that adapts as much as possible to the external shapes of the teeth, adapting even to the imperfections themselves and asymmetries of the patient teeth.

To achieve this, it is commonly used a plaster mold on which the wire is cast to obtain the lingual arch; however, when the mold is used as a support for the forming process, the professional must wait for the complete cure of the mold, which results in significant losses of time. In addition to the above, since the wire is molded by hand, it does not present the degree of pressure necessary to provide the correct treatment to dental deviations, so in many cases the orthodontic treatment has the risk of not complying with the appropriate quality standards.

In order to solve these problems, various automated equipment has been designed over the last few years that seek to make the necessary bends to control the three planes of space (vertical, horizontal, and sagittal) and simulate all imperfections and asymmetries, creating the cantilever arch, without it being necessary to mold the wire on a specific surface. To achieve this, the wire is bent bit by bit by the equipment bending means, without there being any type of impediment to the bending. This type of equipment is described, for example, in U.S. Pat. No. 8,266,940 B2 that protects an apparatus and a method to bending or shaping orthodontic archwires or other medical devices in an individual and complex way, consisting of two mobile manipulators with at least three rotary joints defining three rotation axes and at least three prismatic joints defining at least three translation axes. Therefore, the described equipment must coordinate its two arms to be able to carry out the bending of the wire, which can seriously limit the number of bends that can be made, since, due to the proximity of the heads, they cannot be obtain arch structures in a "U" shape, far from it with very sharp direction changes.

U.S. Pat. No. 7,661,281B2 describes a method for forming orthodontic archwires, which uses a bending equipment in which the wire is held by rotating wheels that push it towards a bending head. The head function of the described machine in this patent is to include nominal curves along the wire, which allow correcting slight deviations with respect to a model introduced in the equipment. However, the head used cannot move on the base of the equipment, so it is not possible to include elevations in the wire, the equipment being restricted to making corrections on a single plane of the archwire.

Patent application US20140130567A1 describes a high speed wire bending equipment, which allows generating complex structures with bends in all three axes. In this equipment, the head is in a fixed work plane, and it is the wire that is turned to obtain bends in three planes X, Y or Z; however, due to the operating plane of the wire holding element, large-format pieces or with 180° bends cannot be manufactured since said pieces would collide with the base of the equipment if it were to make more than one bending on the plane "Z" of the formed piece.

None of the aforementioned equipment allows precise bends in the wire since their bending heads have a very small degree of freedom, in many cases having to rotate the wire on its axis to carry out the necessary bends, having as a consequence a clear limit on the complexity of the formed wire, since it is not possible to make closed bends or carry out lifts with sudden changes in direction, since doing so, the wire would collide with the head causing deformations in the piece created. Also, due to the type of construction of the heads, most of the bending equipment requires a large work surface, which limits its use in small rooms, and in the case of equipment with articulated arms, the complexity of the equipment increases considerably, which can cause errors due to misalignment of the arms, causing much greater wear on the equipment due to the complexity of the transmission mechanisms required to move the heads. and arms.

Accordingly, there is a need to provide an orthodontic wire bender robot, which has a much higher degree of freedom than currently available equipment, allowing the bending head to be moved in any of the three axes of movement (X, Y and Z) and it can be placed on small surfaces to adapt to small spaces. These characteristics are essential for the lingual technique, where the wires are placed through the teeth inner part, an area with a much smaller and more irregular periphery than the one exists on the outside. Also, there is a need to provide an orthodontic wire bender robot with a wireless communications port so that the robot can be programmed to operate remotely without the need to connect it to a physical communications network.

SUMMARY OF THE INVENTION

In order to overcome the limitations of wire bending equipment for obtaining lingual orthodontic wires, the present invention aims to provide a novel wire bender robot that performs horizontal, vertical and sagittal compensations, to generate wires adapted to the contours of the teeth where it will be placed.

Another object of the present invention is to provide a bending robot with means to allow movement of the bending head in the X, Y and Z axes throughout the length, width, and height of the total dimensions of the robot support frame.

A further objective of the present invention is to provide a bending robot adapted to allow bending by torque when using wires with profiles other than round, to incline their faces at certain angle and segment to be able to perform frontal rotational stresses.

Yet another object of the present invention is to provide a wire bender robot that can perform precise bends on a very small scale, bending wire segments up to 180°.

A further objective of the present invention is to provide a bending robot with means for the automatic control of the bending process based on the capture and virtualization of a three-dimensional model of the jaws of the patient to which the orthodontic wire will be applied.

Yet another objective of the present invention is to provide a bending robot with a wireless communication input port, to allow the reception of operating instructions remotely without the need to physically connect the robot to a wired communication network.

The aforementioned, as well as other, objects and advantages of the present invention will become apparent from the following detailed description thereof.

DESCRIPTION OF THE FIGURES OF THE INVENTION

DETAILED DESCRIPTION OF THE INVENTION

Figure 1:
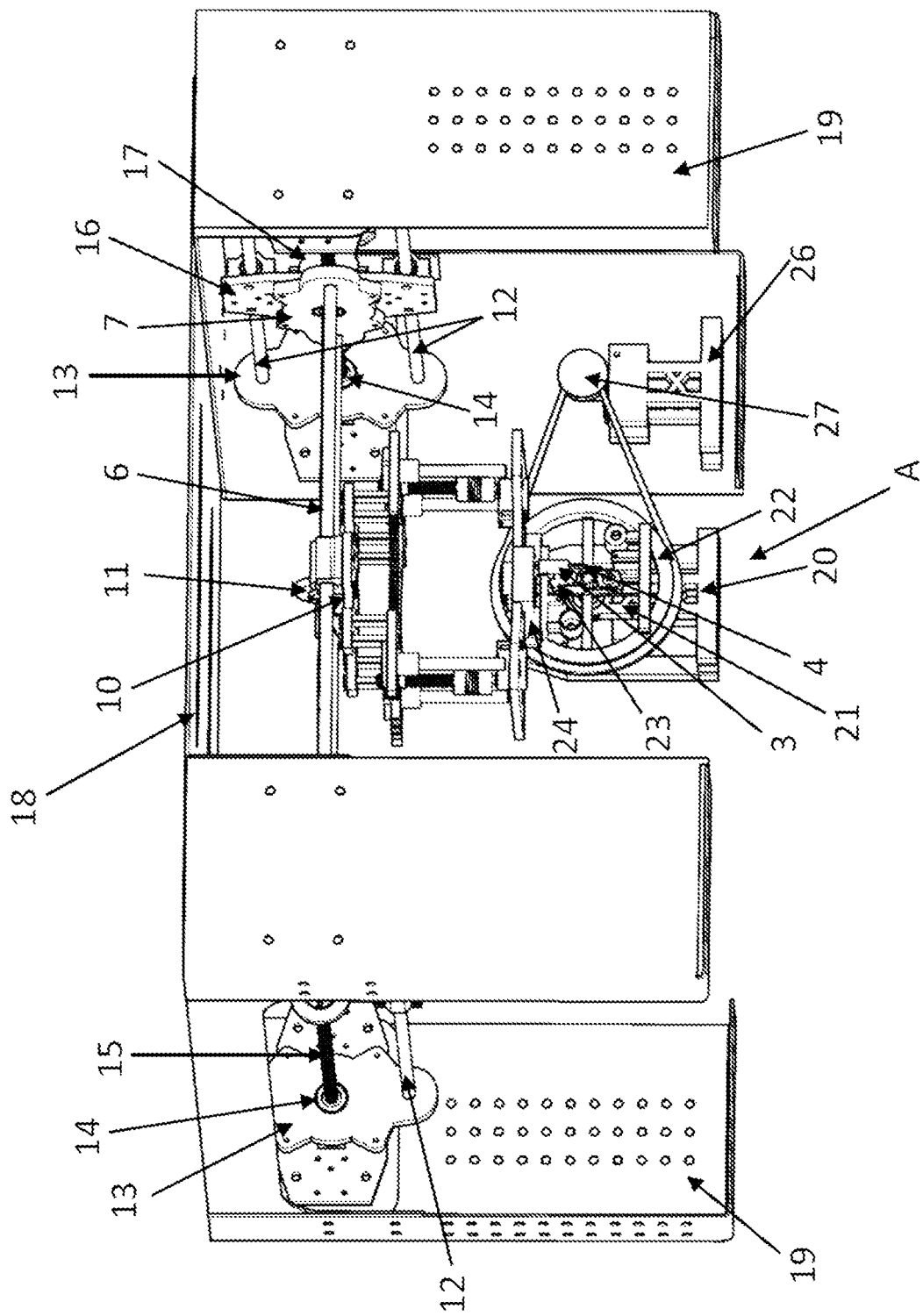
FIG. 1 shows a top perspective view of the orthodontic wire bender robot of the present invention.
Figure 2:
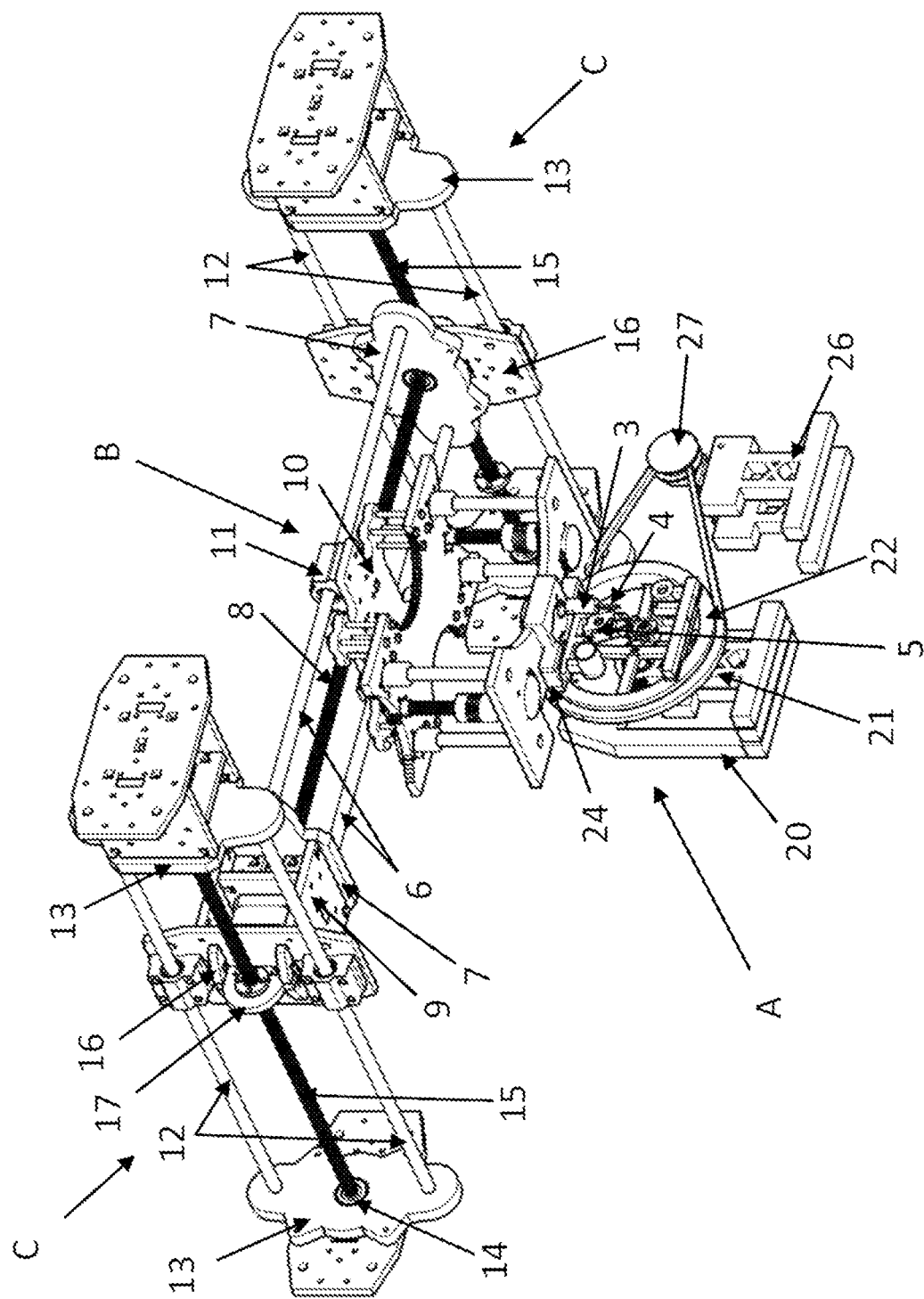
FIG. 2 shows a bottom perspective view showing a close-up of the bending head (A), the shifting mechanism in the "Y" axis (B) and the shifting mechanism in the "X" axis (C), of the orthodontic wire bender robot of the present invention.
Figure 3:
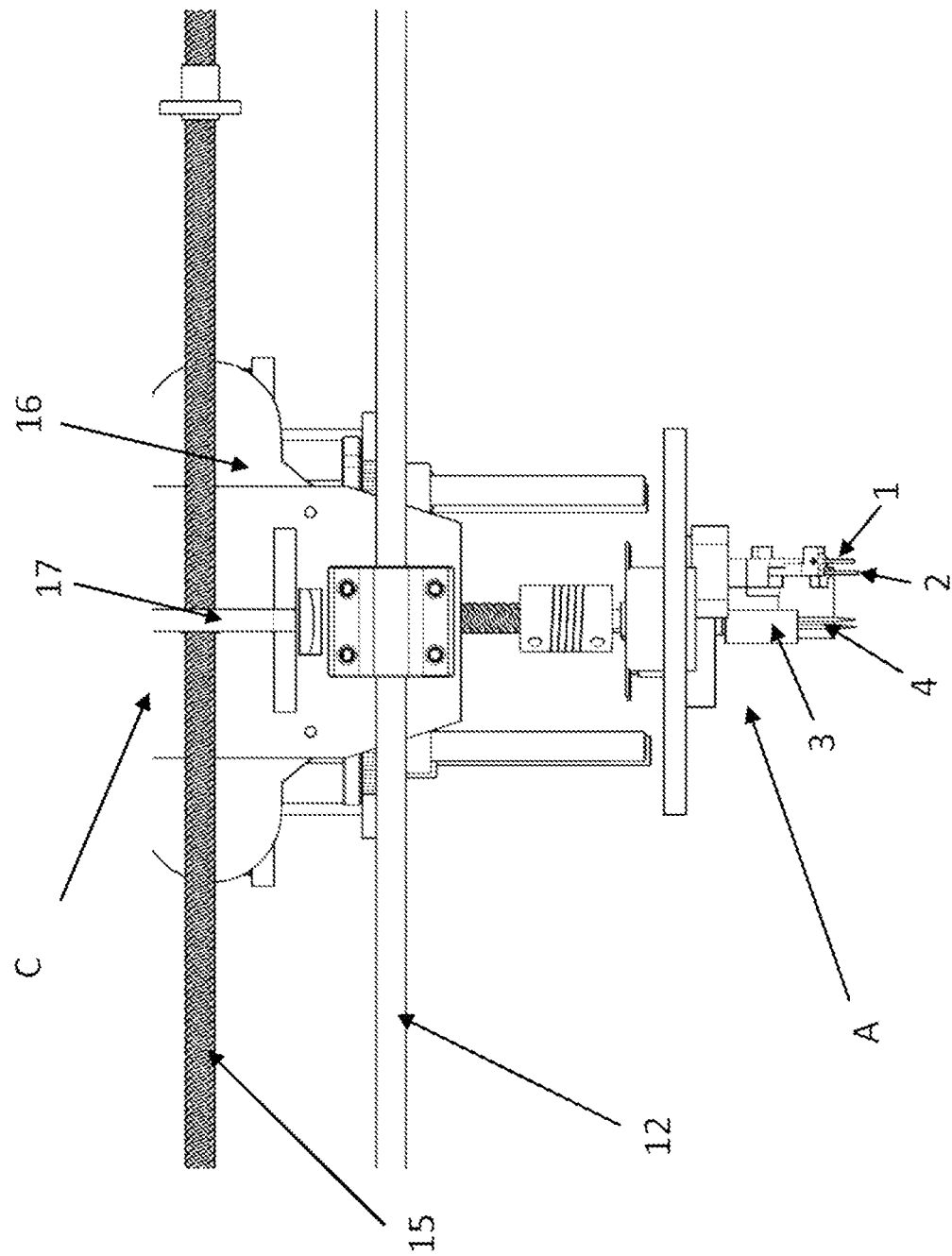
FIG. 3 shows a side view of the bending head (A) of the orthodontic wire bender robot of the present invention.

The present invention provides a novel lingual orthodontic wire bender robot, which allows its bending head to be moved through the X, Y and Z planes along the length, width, and height of the entire length of the central platform of the robot, thereby allowing greater precision in wire bending. The foregoing also provides the robot with the ability to perform bends by torque, carrying out horizontal, vertical, and sagittal compensations, so that the formed orthodontic wire presents inclination in its faces at certain angle and segment to be able to perform front rotation stresses.

To achieve the above, the lingual orthodontic wire bender robot of the present invention is comprised of:
- a bending head (A), with a base having a motor coupled to a vertical lifting spindle that moves the head in the "Z" axis up to 35 mm, the bending head comprising:
- an extrusion mechanism, which controls the advance and retreat of the orthodontic wire, which has a pair of parallel motors with rollers, which are separated from each other by a variable distance between 0.3 to 0.5 mm, which can be controlled by means of an opening selector located between the engines;
- a wire holder (1), located in front of the extrusion mechanism, having at its tip a guide loop (2) through which the wire is passed;
- a bending mechanism (3) located in front of the wire holder (1), made up of a stepper motor whose shaft has a coupling for receiving a pair of dental diamond burs for drilling (4) FG DI-42, acting as bending spikes, said burs being separated from each other by a distance of 0.6 mm, in such a way that the rotation of the motor allows the wire to be bent up to a 180° arc with respect to the entry plane and;
- a pair of twisting grippers (5), with an opening mechanism controlled by servomotors, located in front of the bending mechanism, which are used to twist the wire;
- a shifting mechanism in the "Y" axis (B) made up of a pair of horizontal parallel guides (6), which rest on terminal supports (7), each of which has a central bearing in which it is received an endless screw (8) that is coupled at one of its ends to a motor (9) and; a displacement base (10) to which the bending head (A) is attached, said base (10) having at its ends, slides that run along the pair of parallel guides (6) and, a guide nut (11) located in its central part that receives inside the endless screw (8), in such a way that when the motor is activated, the endless screw moves the nut (11) forward or backwards, controlling the movement of the bending head on the "Y" axis with a travel up to 320 mm;
- A shifting mechanism in the "X" axis (C), made up of two pairs of vertical lateral guides (12), separated from each other by a distance equal to the total length of the shifting mechanism in the "Y" axis (B), each of which rests on a pair of bases (13) with central bearings (14) that receive a pair of endless screws (15), each one coupled to a motor and; a pair of shifting plates (16), which receive the end supports of the shifting mechanism on the "Y" axis (B), each having a pair of slides that run along each of the pair of vertical lateral guides (12) and, a guide nut (17) located in its central part, which receives inside each one of the endless screws (15), in such a way that when the motors are actuated in a synchronized way, allows the movement of the bending head (A) together with the shifting mechanism on the "Y" axis (B) with a travel up to 320 mm;
- a support frame (D), made up of a perforated plate (18), which has two plates with 90° ends (19) welded at its ends, in which the pair of bases are anchored with central bearings of the shifting mechanism in the "X" axis (C) and;
- a controller with a central processing card in charge of converting the input information provided by a three-dimensional scanner to robot control instructions that control the operation of: a motor advance control card, which controls the robot advance movements in the X axis and in the Y axis; a double stepper motor control card, which controls the movement in the Z axis of the bending head (A) and the rotation of the stepper motor of the bending mechanism and; a wire handling card, in charge of clamping and extruding the wire to be processed; said cards being connected to a central battery such that said cards control the delivery of electric current to the motor of the displacement mechanism in the "Y" axis and the motors of the displacement mechanism in the "X" axis; the motors of the bending mechanism and the motor in charge of the movement in the "Z" axis and; the servo motors of the grippers and the extrusion mechanism, respectively.

In one of the preferred embodiments of the present invention, the central processing card is connected to a wireless input port, such as, for example, a WiFi or Bluetooth communication port, enabled to receive the input information from the three-dimensional scanner.

In another embodiment of the present invention, the wireless input port is enabled to receive control signals from a remote control device such as, for example, a joystick or a remote control (not shown), with which the movement in the "X", "Y" and "Z" axes of the equipment is controlled manually, as well as the gripper function and extrusion mechanism. In this embodiment, the central processing card further comprises a remote control card, which converts the signals received from the remote control device, via the wireless input port, into signals that can be interpreted by the central control card, to generate thus, the robot control instructions, which control the motor advance control card, the wire handling card, the bending mechanism motors, the motor in charge of moving along the "Z" axis and the servo motors of the grippers and extrusion mechanism.

In a further embodiment of the present invention, the controller is contained within a casing located on the support frame (D), while in another of its embodiments said controller is within an external casing, having in this embodiment a connector port for the reception of the motor control cables of the shifting mechanism in the "Y" axis, the motors of the shifting mechanism in the "X" axis, the motors of the bending mechanism, the motor in charge of the movement in the "Z" axis, the grippers servo motors and the extrusion mechanism motors, each of the connectors being associated with one of the motor advance control, double stepper motor control and wire handling cards.

In a further embodiment of the present invention, the pair of twisting grippers (5) comprises a main base (20) with a central block (21) in which a four-armed pulley (22) is received; a first twisting gripper (23), located on one of the arms of the four-armed pulley (22) connected to a first servomotor that controls its opening and closing; a 90° extension (24), located in the upper of the main base (20), which has a support block that receives a second twisting gripper (25) coupled to a second servomotor that controls its opening and closing, said second twisting gripper (25) being located in the same working plane of the first twisting gripper (23); a pair of "T" shaped support blocks (26), located on the side of the main base, which receive a torque motor (27) that has a secondary pulley on its axis with a diameter smaller than that of the four-armed pulley, said secondary pulley being connected to the four-armed pulley (22) by means of a transmission belt; in such a way that when the bending mechanism (3) is placed in front of the second twisting gripper (25), it takes the free end of the wire fixing it in a neutral position by closing its jaws caused by the secondary servo motor, while the first twisting gripper (23) takes the rest of the wire, pressing it with its jaws, activating the torsion motor, so that said first twisting gripper (23) moves with respect to the central axis of the four-armed pulley (22), causing twisting of the wire in its sagittal plane. In this embodiment, both the main base (20) and the pair of "T" shaped support blocks (26) are located on a secondary platform fixed to the two plates with 90° ends (19) of the support frame (D).

The present invention has been described in accordance with a preferred embodiment; however, it will be apparent to a person skilled in the art that modifications can be made to the invention without departing from its spirit and scope.

The invention claimed is:

1. An orthodontic wire bender robot to be used in the manufacture of lingual orthodontic wires, comprising:
a bending head (A) having a base with a motor coupled to a vertical lifting spindle that moves the head in the "Z" axis; an extrusion mechanism, which controls the advance and retreat of the orthodontic wire, with a pair of parallel motors with rollers, which are separated from each other by a variable distance between 0.3 to 0.5 mm; a wire holder (1), located in front of the extrusion mechanism, having at its tip a guide loop (2) through which the wire is passed; a bending mechanism (3) located in front of the wire holder (1), with a stepper motor whose shaft has a coupling for the reception of a pair of dental diamond burs for drilling (4) being separated from each other by a distance of 0.6 mm and; a pair of twisting grippers (5) with an opening mechanism controlled by servomotors, located in front of the bending mechanism, which are used to twist the wire;
a displacement mechanism in the "Y" axis (B) that has a pair of horizontal parallel guides (6), which rest on terminal supports (7), each of which has a central bearing in which it is received an endless screw (8) coupled at one of its ends to a motor (9) and; a displacement base (10), to which the bending head (A) is attached, with slides on its ends that run along the pair of parallel guides (6) and, a guide nut (11) located in its central part, which receives inside the endless screw (8), in such a way that when the motor is activated, the endless screw (8) moves the nut (11) forward or backward, controlling the movement of the bending head in the "Y" axis with a travel up to 320 mm;
a shifting mechanism in the "X" axis (C), which has two pairs of vertical lateral guides (12), separated from each other by a distance equal to the total length of the shifting mechanism in the "Y" axis (B), each of which rests on a pair of bases (13) with central bearings, which receive a pair of endless screws (15), each one coupled to a motor and; a pair of shifting plates (16), which receive the end supports of the shifting mechanism on the "Y" axis (B), each with a pair of slides that run along each of the pair of vertical lateral guides (12) and, a guide nut (17) located in its central part, which receives inside each one of the endless screws (15), in such a way that when the motors are actuated in a synchronized way, allows the movement of the bending head (A) together with the shifting mechanism on the "Y" axis (B) with a travel up to 320 mm;
a support frame (D), made up of a perforated plate (18), which has two plates with 90° ends (19) welded at its ends, in which the pair of bases are anchored with central bearings of the shifting mechanism in the "X" axis (C) and;
a controller with a central processing card for the conversion of the input information provided by a three-dimensional scanner, to robot control instructions; a motor advance control card, which controls the advance movements of the robot in the X axis and in the Y axis; a double stepper motor control card, which controls the movement in the Z axis of the bending head (A) and the rotation of the bending mechanism stepper motor and; a wire handling card in charge of clamping and extruding the wire to be processed; said cards being connected to a central battery such that said cards control the delivery of electric current to the motor of the shifting mechanism on the "Y" axis and the motors of the shifting mechanism on the "X" axis; the motors of the bending mechanism and the motor in charge of the movement in the "Z" axis and; the servo motors of the grippers and the extrusion mechanism respectively.

2. The orthodontic wire bender robot according to claim 1, wherein the pair of twisting grippers (5) comprise a main base (20) with a central block (21) in which a four-armed pulley (22); a first twisting gripper (23), located on one of the arms of the pulley (22), which is connected to a first servomotor that controls its opening and closing; a 90° extension (24), located in the upper of the main base (20), which has a support block that receives a second twisting gripper (25) coupled to a second servomotor that controls its opening and closing, said second twisting gripper (25) being located in the same working plane of the first twisting gripper (23) and; a pair of "T" shaped support blocks (26), located on the side of the main base, which receive a torque motor (27), which has on its axis a secondary pulley with a diameter smaller than that of the four-armed pulley, said secondary pulley being connected to the four-armed pulley by means of a transmission belt.

3. The orthodontic wire bender robot according to claim 2, wherein the main base (20) and the pair of "T" shaped support blocks (26) are located on a secondary platform fixed to the two plates with 90° ends (19) of the support frame (D).

4. The orthodontic wire bender robot according to claim 1, wherein the central processing card is connected to a wireless input port, for receiving input information from the three-dimensional scanner.

5. The orthodontic wire bender robot according to claim 4, wherein the wireless input port is a WiFi communication port or a bluetooth communication port.

6. The orthodontic wire bender robot according to claim 4, wherein the wireless input port is enabled to receive control signals from a remote control device selected from a joystick and a remote control to the manual control of the movement in the "X", "Y" and "Z" axes of the equipment, as well as the function of the grippers and the extrusion mechanism.

7. The orthodontic wire bender robot according to claim 6, wherein the central processing card also comprises a remote control card, which converts the signals received from the remote control device, via the wireless input port, into signals that can be interpreted by the central control card, to generate the robot control instructions.

8. The orthodontic wire bender robot according to claim 1, wherein the controller is contained within a casing located on the support frame (D).

9. The orthodontic wire bender robot according to claim 1, wherein the controller is inside an external casing, and has a connector port for receiving the motor control cables of the shifting mechanism in the "Y" axis, the motors of the shifting mechanism in the "X" axis, the motors of the bending mechanism, the motor in charge of the movement in the "Z" axis, the grippers servo motors and the motors of the extrusion mechanism, each of the connectors being associated with one of the motor advance control, double stepping motor control and wire handling cards.

10. The orthodontic wire bender robot according to claim 5, wherein the wireless input port is enabled to receive control signals from a remote control device selected from a joystick and a remote control to the manual control of the movement in the "X", "Y" and "Z" axes of the equipment, as well as the function of the grippers and the extrusion mechanism.

\* \* \* \* \*